United States Patent
Kraus

[11] Patent Number: 6,105,908
[45] Date of Patent: Aug. 22, 2000

[54] RETAINER STRAP WITH BREAKABLE HINGE MEMBER

[75] Inventor: Willibald Kraus, Grünstadt, Germany

[73] Assignee: TRW Automotive Electronics & Components GmbH & Co. KG, Germany

[21] Appl. No.: 09/175,297

[22] Filed: Oct. 20, 1998

[30] Foreign Application Priority Data

Oct. 21, 1997 [DE] Germany .......................... 197 46 424

[51] Int. Cl.[7] ................ B64B 1/36; B64C 15/00; B65D 63/00; B65D 67/02
[52] U.S. Cl. ........................ 248/74.3; 24/16 PB
[58] Field of Search .................. 248/74.3, 74.1, 248/68.1, 73, 70, 71, 69, 62, 60, 909; 24/16 PB

[56] References Cited

U.S. PATENT DOCUMENTS

| | | | |
|---|---|---|---|
| 3,118,200 | 1/1964 | Bell | 24/16 PB |
| 3,149,808 | 9/1964 | Weckesser . | |
| 3,860,997 | 1/1975 | Van Riper, Jr. et al. | 24/16 PB |
| 4,447,934 | 5/1984 | Anscher | 248/74.3 X |
| 4,805,856 | 2/1989 | Nicoli et al. | 248/74.3 |
| 5,042,535 | 8/1991 | Schlottke | 24/16 PB X |
| 5,131,613 | 7/1992 | Kamiya et al. | 248/74.3 |
| 5,326,055 | 7/1994 | Page et al. | 248/74.3 |
| 5,746,401 | 5/1998 | Condon | 248/74.3 X |

FOREIGN PATENT DOCUMENTS

| | | |
|---|---|---|
| 0 709 609 | of 0000 | European Pat. Off. . |
| 1462539 | 12/1966 | France . |
| 195 40 418 | of 0000 | Germany . |
| 2 045 300 | 3/1971 | Germany . |
| 321 896 1 | 11/1983 | Germany . |

OTHER PUBLICATIONS

European Search Report dated Feb. 28, 2000.

Primary Examiner—Ramon O. Ramirez
Assistant Examiner—J De Luca
Attorney, Agent, or Firm—Fay, Sharpe, Fagan, Minnich & McKee, LLP

[57] ABSTRACT

A retainer strap for fastening tubular objects to associated support structures includes a bearing region adapted for connecting the strap to an associated support structure, an elongate strap element having a plurality of catch teeth arranged along the strap element and a holding region formed on a first end of the elongate strap element for selectively receiving and holding the second end of the strap element therein. A breakable hinge member formed integrally with the retainer strap during manufacture initially connects the bearing region directly to the strap element. The breakable hinge is selectively manually severable to permit relative slidable movement of the bearing region on the strap element to enable a selectable relative distance between the bearing region and the holding region so that the retainer strap can be used in a wide variety of applications.

20 Claims, 1 Drawing Sheet

RETAINER STRAP WITH BREAKABLE HINGE MEMBER

BACKGROUND OF THE INVENTION

The subject invention is directed toward the art of retainer straps used to encircle and fasten tubular shaped articles to operatively associate support structures. More particularly, the subject invention is directed to a retainer strap having a holding region on one end with catches adapted to engage stop notches formed on the strap and further including a bearing region for connecting the retainer strap to an associated support structure, the bearing region being movable on the strap relative to the holding region to provide relative distance between the holding and bearing regions.

Various constructions of the retainer strap of the type noted above are taught in the prior art including, as examples, German Patent DE 0S 20 45 300 and French Patent FR PS 1 462 539. One disadvantage of the retainer strap constructions taught in these prior art documents, however, is that the bearing region provided to connect the straps to an associated support structure is formed integrally with the strap element as a single-piece unit. This prevents relative movement between the holding region and the bearing region. Accordingly, the distance between the holding region on the second end of the strap and the bearing region in retainer straps of this type is generally non-adjustable. This makes the straps difficult to use and limits their application.

Another form of restrainer strap is taught in German Patent DE 32 18 961 A1. In that document, a retainer strap includes a strap element that is formed in a fashion to include notches at its opposite longitudinal sides. The notches engage a corresponding set of teeth to enable selective retainer strap positions.

One drawback to the aforementioned retainer strap constructions is the fixed relationship between the bearing region and the holding region. In some retainer strap applications, it becomes necessary to adjust the distance relationship between the bearing region and the holding region on the end of the strap in order to properly encircle a set of tubular shaped articles and securely fasten the articles to an associated support structure. In the prior art retainer strap constructions, it is not possible to mechanically conform the relative distance between the holding region and the bearing region in accordance with practical application requirements.

SUMMARY OF THE INVENTION

Accordingly, the subject invention provides an adjustable retainer strap that finds application in diverse fields because of its ability to perfectly fasten, as an example, tubes or cables of highly different diameter, to an operatively associated support structure. More particularly, in accordance with one aspect of the invention, the bearing region is initially connected to the holding region by at least one breakable hinge member. In an unsevered condition, the hinge member prevents relative movement between the bearing region and the holding region. However, following breakage of the hinge member, relative slidable movement between the bearing region and the holding region is enabled. In the preferred embodiment, the hinge member is manually breakable. This results in an advantage that the relative distance between the holding region and the bearing region can be easily modified to accommodate various application size, shape, and alignment features and requirements in the field by service personnel.

In accordance with another aspect of the invention, the retainer strap includes an elongate strap element defining a plurality of stop teeth disposed in a spaced-apart relationship along a longitudinal axis defined by the retainer strap. The retainer strap further includes a bearing region for connecting the strap to an associated support structure. The bearing region is adapted to receive the strap element of the retainer strap and includes at least one stop catch biased in a direction transverse to the longitudinal axis of the strap element so that the stop catch is engagable with the stop teeth. In that way, relative slidable movement between the bearing region and the strap element of the retainer strap is used to adjust the relative distance between the bearing region and the holding region as needed. The stop catch is engagable with the plurality of stop teeth to provide a corresponding plurality of stop or arrested positions. The bearing region preferably includes four cross-pieces disposed adjacent a bearing area adapted to be connected with an operatively associated support structure. The stop catch is preferably carried on at least one of the cross-pieces. The stop catch is adapted to embed itself into at least one stop tooth disposed along the strap element to hold the strap element in place relative to the bearing region. The stop catch is resilient and therefore enables the connection between the retainer strap and the bearing region to be arbitrarily changeable to adjust the distance between the bearing region and the holding region as necessary.

Preferably, in accordance with a further aspect of the invention, a pair of the cross-pieces are equipped with longitudinal guideways. Further, the breakable hinge member is arrange to extend in a direction transverse to the longitudinal axis of the strap element. The hinge member extends between two opposed cross-pieces so that the entire retainer strap of the present invention can be produced as a unitary construction in a single extrusion process. At the time of manufacture of the subject retainer strap, the bearing region is fixedly connected and formed integrally with the strap element through the breakable hinge member. That is, the breakable hinge member is formed integrally with the bearing region and strap element. During installation of the subject retainer strap, the breakable hinge member is severed permitting relative slidable movement between the elongate strap member and the bearing region so that an appropriate adjustment can be made of the distance between the bearing region and the holding region on the end of the strap element. Typically, the adjustment is made to accommodate articles of various sizes that are to be fastened by the retainer strap to an associated support structure.

Further in accordance with the invention, a dish-shaped member is supported on the bearing region by the plurality of cross-pieces formed at the bearing region. The dish-shaped member is adapted to engage and support a plurality of tubular members atop the bearing region. In an alternate preferred form, the dish-shaped member is adapted to accept one or more insert retainers such as, for example, loop around tubes. Alternatively, the bearing region is provided with a plug having a terminal head adapted for embedded insertion into a construction with a groove in order to fasten the subject retainer strap, via the bearing region, to a corresponding element.

In accordance with yet another aspect of the invention, a sealing lip is provided at the bearing region and for sealing the bearing region connection to the operatively associated support structure. The sealing lip preferably includes at least one perforation.

The retaining region preferably defines two opposed catches which are each respectively fitted with at least one catch tooth. The two opposed catches are preferably carried by elastic cross-pieces of the retaining region. They are arranged to extend into an insertion slot formed in the retaining region. Preferably, the insertion slot formed in the retaining region has a rectangular cross-section defined by two transverse cross-pieces and one longitudinal cross-piece in the lower region of the retaining region.

As can be seen from the foregoing, the primary object of the invention is the provision of a retainer strap having a holding region on one end of an elongate strap element and a bearing region connected to the strap element by a breakable hinge member that can be manually severed to permit relative slidable movement between the bearing region and the elongate strap element.

A further object of the invention is the provision of at least one stop catch member carried at the bearing region and adapted to engage a plurality of catch teeth formed on the strap element of the retainer strap. The at least stop catch member is engagable with the plurality of catch teeth so that the bearing region can be held at multiple selected arrest positions along the strap element.

A still further object is the provision of a set of cross-pieces extending in a direction transverse to the longitudinal axis of the strap element. The cross-pieces carry a dish-shaped member adapted to support and engage a set of tubular elements.

Yet a still further another object is the provision of a pair of longitudinal guideways carried on at least two of the cross-pieces. The guideways assist in directing the strap element and catch teeth through an insertion slot formed by the set of cross-pieces carried on the bearing region.

Still other objects and advantages of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
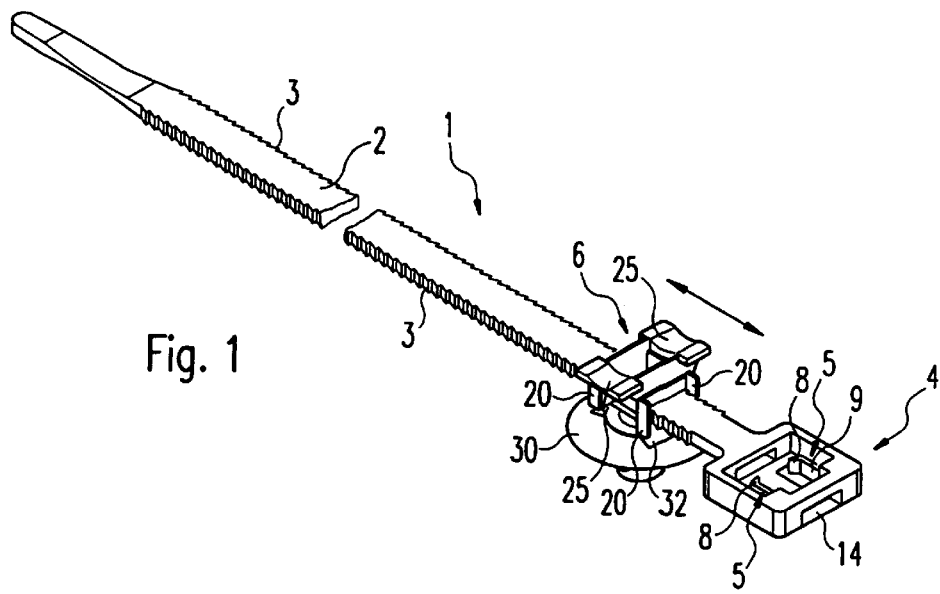
FIG. 1 is a perspective view of a retainer strap formed in accordance with the invention.
Figure 2:
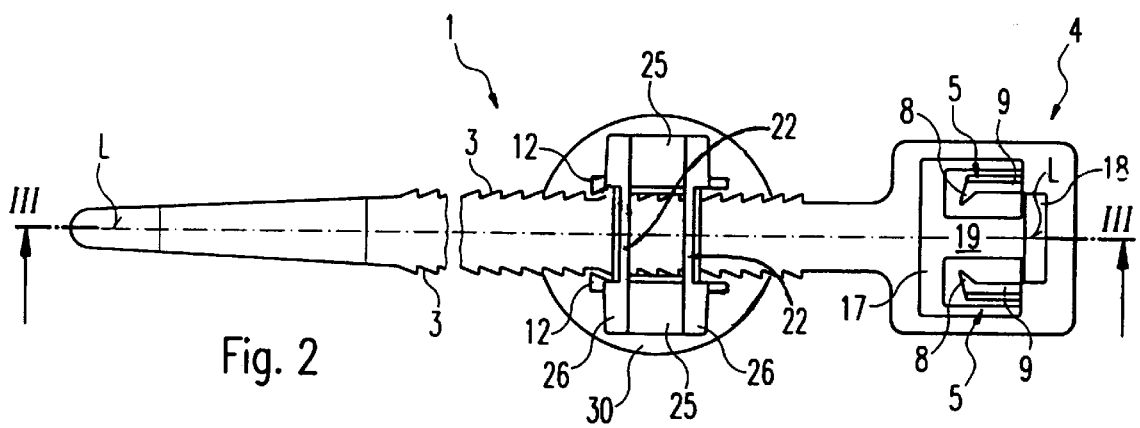
FIG. 2 is a top plan view of the retainer strap shown in FIG. 1.
Figure 3:
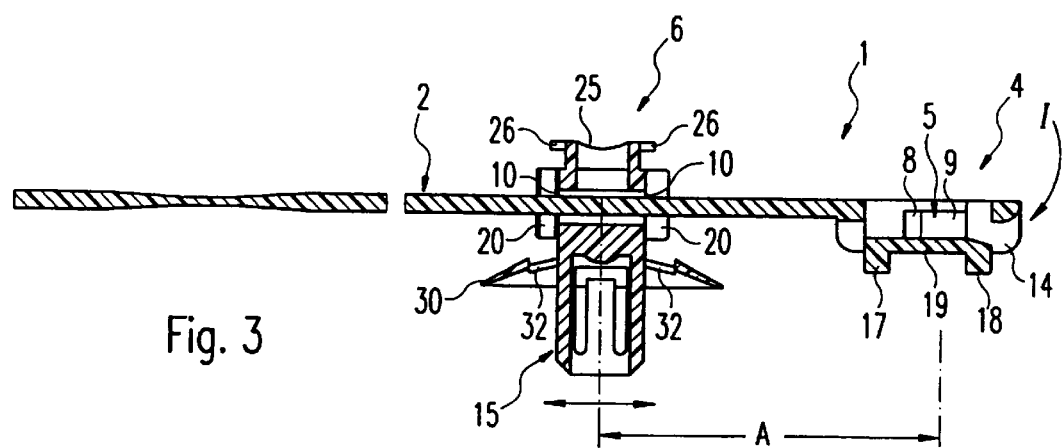
FIG. 3 is a cross-sectional view of the subject retainer strap taken along line III—III of FIG. 2.

Referring now to the drawings wherein the showings are for the purpose of illustrating the preferred embodiment of the invention only and not for purposes of limiting same, FIGS. 1–3 depict a retainer strap 1, preferably made of plastic, which is adapted for use in attaching tubular type articles (not shown) such as tubes or cables to an operatively associated support structure (not shown). The retainer strap 1 essentially consists of an elongate strap element 2 having a plurality of catch teeth 3 spaced apart along the strap element 2. A holding region 4 is formed on a first end of the elongate strap element as shown. The holding region includes a set of resilient catches 5 extending inwardly toward each other in a manner as illustrated. The catches 5 are biased in the position shown so that they engage the plurality of catch teeth 3 as the free end of the strap element is passed through a central aperture in the holding region when the retainer strap 1 is fastened around tubular objects in a manner well known in the art.

A bearing region 6 is disposed on the strap element as shown. In accordance with the present invention, the bearing region is initially connected to the strap element 2 by a hinge member 10 when the subject retainer strap 1 is manufactured, but is locatable on the strap element at multiple selected distances relative to the holding region after the hinge member 10 is severed. The ability to locate the bearing region at multiple distances relative to the holding region after the hinge member is severed enables the subject retainer strap to be used in a wide range of applications.

As shown best in FIG. 3, the bearing region 6 is initially connected with the strap element 2 via at least one breakable film hinge member 10. Thus, the retainer strap 1 is manufactured as a single-piece unit. The bearing region 6 is connected directly to the strap element 2 by a pair of film hinge members 10 that extend in a direction transverse to the longitudinal axis L-L (FIG. 2) of the strap element 2.

As shown in the drawings, the strap element is formed in a manner to provide a plurality of integral catch teeth 3 spaced apart along the strap element 2. The catch teeth are formed on opposite longitudinal sides of the strap element along parallel rows. As shown best in FIG. 2, the bearing region 6 includes at least one, but preferably two, stop catches 12 adapted for selective embedded engagement with the plurality of catch teeth 3. The stop catches 12 are biased in the position shown but are movable in a direction transverse to the longitudinal axis L-L of the strap element 2. As shown in FIGS. 2 and 3, the stop catches 12 are carried on cross-pieces 20. The cross-pieces 20 are disposed adjacent a bearing area 15 formed by the bearing region 6. The bearing area 15 adapts the bearing region 6 to be mounted or otherwise connected to an operatively associated support member (not shown).

With continued reference to FIG. 2, a pair of longitudinal guideways 22 are carried on a pair of cross-pieces 20 for guiding the strap element 2 through an aperture formed in the bearing region 6. In the preferred embodiment illustrated in the figures, two stop catches 12 are employed by the present invention and are arranged at a pair of cross-pieces 20 on opposite sides of the aperture formed in the bearing region as shown.

When the subject retainer strap is manufactured, a breakable hinge member connects the bearing region 6 to the strap element 2. The breakable film hinge member 10 is adapted to be selectively severed during the process of installing the subject retainer strap. According to the invention, the breakable hinge member 10 connects the bearing region 6 to the elongate strap member 2 to prevent relative movement between the bearing region and the strap element. When the hinge member is broken and placed in a severed state, relative slidable movement between the elongate strap element 2 and the bearing region 6 is enabled.

Since the holding region 4 is carried on one end of the strap element 2, the relative movement between the bearing region and the strap element is useful to set a selected distance between the bearing region and the holding region in order to enable the subject retainer strap to be used in a wide variety of applications to accommodate tubular objects of various sizes and shapes. The bearing region 6 is movable in the direction of the arrow shown in FIGS. 1 and 3. The movement of the bearing region 6 allows for a user of the subject retaining strap to correct a distance of the bearing region 6 relative to the holding region 4.

A pair of stop catches 12 carried on cross-pieces 20 embed themselves into corresponding stop teeth 3 formed on the strap element 2. The mechanical interaction between the inwardly biased stop catches 12 against the teeth 3 selectively secure the bearing region into multiple desired positions along the strap element 2.

As is further evident from FIGS. 1 and 2, the cross-pieces 20 carry a dish-shaped member including a pair of dish supports 25. According to FIG. 2, the pair of dish supports 25 are spaced apart by a predetermined distance from each other and are located on opposite sides of the aperture formed in the bearing region. The dish supports 25 are preferably each formed with a pair of cross-pieces 26 that extend between the dish supports on opposite sides of the aperture. The cross-pieces 26 are formed to accept a standard insert fastener (not shown). Typical insert fasteners well known in the art include spaced-apart grooves into which the cross-pieces 26 of the dish supports 25 embed themselves.

In addition to the construction identified above, a cone-shaped head can be alternatively provided on the bearing region 6 supported by the set of cross-pieces 20. The alternative cone-shaped head is preferably adapted to be inserted into a groove of another component associated with the retainer strap.

As shown in the drawings, the bearing region 6 includes at least one sealing lip 30 disposed between the bearing area 15 and the cross-pieces 20. Preferably, the sealing lip 30 is provided with at least one perforation 32 as shown best in FIG. 3. In accordance with the invention, two perforations 32 are positioned in an opposed relationship. The bearing area 15 defines two opposed elastic engagement cross-pieces for adapting the bearing region 6 to connect to an associated support structure. Although the bearing area 15 is shown having two opposed elastic engagement cross-pieces, other configurations are contemplated within the scope and spirit of the present invention such as, for example, a pine tree cone shape or a hollow cylindrical profile with interior contact elements.

As best shown in FIG. 2, the holding region includes a pair of opposed catches 5 which are each respectively fitted with at least one catch tooth 8. Alternatively, the two catch teeth 8 can be arranged behind each other at each of the catch mechanisms 5 in a side-by-side arrangement. The catch mechanisms 5 are preferably positioned at the anterior region of the elastic cross-pieces 9, whereby, as shown in FIGS. 1 and 3, the elastic cross-pieces 9 extend into an insertion region 14 of the holding region 4.

With particular reference to FIGS. 2 and 3, the holding region 4 is formed in a generally rectangular shape having a pair of transverse cross-pieces 17, 18 and one longitudinal cross-piece 19 in the lower region of the holding region. Although the rectangular holding region shape is preferred, any geometric shape can be used.

During use of the subject retainer strap, after the bearing region 6 has been adjusted at the functionally correct selected distance relative to the holding region, the tubes or cables can be clamped onto the dish supports 25 and latched thereto by the strap element 2. The bearing region 6 is held in place at the selected distance from the holding region by the interengagement of the stop catches 12 with the plurality of catch teeth 3. After the strap element is looped around the tubes or cables disposed on the dish support members 25, the free end of the strap element is inserted in the direction labeled I (FIG. 3) into the insertion slot 14 of the holding region 4. As the free end of the strap element 2 is pulled through the insertion slot 14, the catch teeth 8 embed themselves into the catch teeth 3 of the strap element 2 to thus render the entire arrangement secure.

As a result of the adjustable relative distance between the bearing region 6 and the holding region 4, the retainer strap of the present invention can be used in a wide variety of retainer strap applications.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A retainer strap for fastening tubular objects to an associated support structure, the retainer strap comprising:

a bearing region adapted for connection to the associated support structure;

an elongate strap element received in the bearing region and defining a longitudinal axis;

a plurality of catch teeth spaced apart along the strap element;

a holding region formed on a first end of the elongate strap element, the holding region defining an insertion slot adapted to selectively receive a second end of the elongate strap element within the holding region;

a catch mechanism at the holding region for releasably engaging said plurality of catch teeth to prevent withdrawal of said second end of the elongate strap element from the holding region;

a breakable hinge member connecting the bearing region to the elongate strap element when in an unsevered condition and permitting relative slidable movement between the elongate strap element and the bearing region when in a severed condition; and, at least one stop catch member connected with said bearing region, the at least one stop catch member being biased in a direction transverse to the longitudinal axis to engage said plurality of catch teeth.

2. The retainer strap according to claim 1 wherein said bearing region includes:

a bearing area for adapting the bearing region for connection to said associated support structure; and, a set of cross-pieces disposed adjacent said bearing area and extending in a direction transverse to said longitudinal axis, the set of cross-pieces being spaced apart to receive said elongate strap element therebetween, at least one of said cross-pieces carrying said stop catch member.

3. The retainer strap according to claim 2 further including a pair of longitudinal guideways carried on at least two of said set of cross-pieces.

4. The retainer strap according to claim 3 wherein said breakable hinge member extends in a direction transverse to said longitudinal axis, said breakable hinge member extending between a pair of said cross-pieces disposed on opposite sides of said elongate strap element therebetween.

5. The retainer strap according to claim 4 further including a dish-shaped member supported on said bearing region by said set of cross-pieces.

6. The retainer strap according to claim 5 wherein said dish-shaped member includes a pair of dish-shaped support members supported on said bearing region by said set of cross-pieces.

7. The retainer strap according to claim 6 wherein said dish-shaped support members extend outwardly from said set of cross-pieces in a direction transverse to said longitudinal axis.

8. The retainer strap according to claim 2 wherein said bearing region includes at least one sealing lip disposed between the bearing area and the set of cross-pieces.

9. The retainer strap according to claim 8 wherein said sealing lip includes at least one perforation.

10. The retainer strap according to claim 9 wherein said catch mechanism includes at least one catch tooth adapted to engage said plurality of catch teeth provided on said strap element.

11. The retainer strap according to claim 10 wherein said catch mechanism includes at least one elastic cross-piece member disposed at said holding region.

12. The retainer strap according to claim 11 wherein said at least one elastic cross-piece member extends into said insertion slot.

13. The retainer strap according to claim 10 wherein said holding region is substantially rectangular in overall shape and includes a pair of transverse cross-pieces and an elongate longitudinal cross-piece.

14. The retainer strap according to claim 1 wherein said hinge member defines a direct mechanical connection between the bearing region and the elongate strap element when the hinge member is in said unsevered condition.

15. The retainer strap according to claim 14 wherein said relative slidable movement between said elongate strap element and said bearing region enables selective adjustment of a distance between said bearing region 6 and said holding region.

16. A plastic retainer strap comprising:

an elongate strap element having a holding region on one end and a set of catch teeth provided along the length of the strap element, the catch teeth being selectively engagable with a corresponding catch mechanism on the holding region when a free end of the strap element is looped through the holding region;

a bearing region for connecting the strap element to an associated support structure; and, at least one film hinge member formed integrally with the bearing region and the strap element, the at least film hinge member being breakable to permit relative movement between the bearing region and the holding region of the retainer strap, said bearing region including i) at least one catch member engagable with said catch teeth on the elongate strap element to provide multiple selectable arrest positions of the bearing region along the elongate strap element, and ii) an arcuate member defining a curved surface adapted to engage an associated tubular object to be fastened by the strap element to the associated support structure.

17. A retainer strap comprising:

an elongate strap element having a holding region on one end and a set of catch teeth provided along a length of the strap element, the catch teeth being selectively engagable with a corresponding catch mechanism on the holding region when a free end of the strap element is looped through the holding region;

a bearing region for connecting the retainer strap to an associated support structure; and, at least one film hinge member directly connecting the bearing region to the strap element, the at least one film hinge member preventing relative slidable movement between the elongate strap element and the bearing region when connecting the bearing region to the strap element and being breakable to permit relative movement between the bearing region and the elongate strap element.

18. The retainer strap according to claim 17 further including at least one catch member associated with said bearing region and engagable with said catch teeth on the elongate strap element to provide multiple selectable arrest positions of the bearing region along the elongate strap element.

19. The retainer strap according to claim 17 further including:

a set of cross-pieces disposed adjacent said bearing region and extending in a direction transverse to a longitudinal axis defined by said elongate strap element, the set of cross-pieces being spaced apart to receive said elongate strap element therebetween; and, a pair of longitudinal guideways carried on at least two of said set of cross-pieces.

20. The retainer strap according to claim 19 further including a disk-shaped member carried on said pair of longitudinal guideways, the disk-shaped member being adapted to engage an associated insert fastener.

* * * * *